United States Patent Office 2,816,919
Patented Dec. 17, 1957

2,816,919

METHOD OF PREPARING ACYCLIC CARBOXYLIC ACIDS

Raymond Wynkoop, Metuchen, N. J., and John J. Giachetto, La Romana, Dominican Republic, assignors to National Distillers and Chemical Corporation, a corporation of Virginia No Drawing. Application November 23, 1955, Serial No. 548,757

10 Claims. (Cl. 260—533)

The present invention relates broadly to improvements in the treatment of certain carbonated mixtures to facilitate processing of such mixtures in the recovery of desired components or derivatives of such components from said mixtures. More particularly, the invention relates to an improvement in the treatment of carbonated mixtures comprising alkali metal salts of carboxylic acids, prepared as described more fully hereinafter, whereby to obviate or substantially minimize processing difficulties attendant to the recovery of such salts and derivatives thereof.

Various types of reactions are known for preparation of alkali metal organic compounds by reaction of an alkali metal with suitable organic intermediates. For example, a particularly valuable type of alkali metal derivative can be made from conjugated diolefins by reaction with an alkali metal under selective conditions whereby alkali metal addition products first formed with the diene are selectively dimerized by coupling to provide a practical synthesis for desirable and highly valuable aliphatic hydrocarbon structures. Thus, the reaction of diolefins such as butadiene, dimethyl pentadiene, isoprene, and methyl petadienes with an alkali metal provides dimerized derivatives which can be readily converted into useful products, as for example, by carbonation to yield carboxylic acids. With respect thereto, it has recently been discovered that if a finely dispersed alkali metal such as sodium dispersed in a suitable liquid medium is used, a metalation reaction proceeds selectively to yield desirable products in high yields. For example, an aliphatic conjugated diolefin such as butadiene may be initially treated with finely dispersed sodium in a suitable liquid ether medium to produce a mixture comprising disodiooctadienes and a small amount of intermediate products such as sodiobutenes, sodiooctadienes and other sodioalkenes and which mixture can be carbonated to produce a mixture comprising isomeric salts of $C_{10}$ unsaturated dicarboxylic acids in high yields and selectivities and a small amount of salts of unsaturated monobasic acids including $C_5$, $C_9$, $C_{13}$ and higher monobasic unsaturated acids. Other diolefins, such as those aforesaid, perform in similar manner.

For carrying out the aforesaid reaction whereby the metalation proceeds selectively to produce the dialkali metal derivatives of the diene dimers in selective high yields, the alkali metal employed for the metalation reaction should be in finely divided form. In general, this requires that the alkali metal be in a finely dispersed state in a liquid reaction medium. Although either sodium or potassium, as well as mixtures of sodium and potassium, and of sodium and calcium, and the like, may be used as the alkali metal reactant, the use of sodium is preferred as sodium gives excellent selectivities and yields of the dimer products and is cheaper and more readily available. In illustration, a sodium dispersion in which the average particle size is less than 50 microns is quite satisfactory for carrying out the process, the preferred size range being 5 to 15 microns. Such a dispersion is most conveniently made in an inert hydrocarbon as a separate step preliminary to the selective dimerization reaction.

The reaction medium found most suitable for use in the metalation reaction consists essentially of an ether and only certain types of ethers are effective. These particular classes of ethers appear to have the common property of serving as promoters of the selective dimerization reaction involved. The ether can be any aliphatic mono ether having a methoxy group, in which the ratio of the number of oxygen atoms to the number of carbon atoms is not less than 1:4. Typical examples include dimethyl ether, methyl ethyl ether, methyl n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. Diethyl ether and hydrocarbon type solvents such as isooctane, kerosene, toluene, and benzene cannot be used exclusively as reaction media since they adversely affect the reaction.

The ethers should not contain any groups such as hydroxyl, carboxyl and the like which are distinctly reactive toward sodium. Although the ether may react in some reversible manner, it must not be subject to extensive cleavage, since such cleavage action destroys the ether, uses up sodium and introduces into the reacting system sodium alkoxide which, in turn, tend to induce rubber-forming reactions with the diene rather than promoting the desired dimerization reaction.

Although the reaction medium should consist essentially of the specified ethers, other inert media can be present in limited amounts. In general, these inert media will be introduced with the alkali metal dispersion as the liquid in which the metal is suspended and will act chiefly as diluents. The concentration of ether in the reaction mixture should at all times be maintained at a sufficient level to have a substantial promoting effect upon the desired dimerization reaction.

It is generally desirable to include in the dimerization reaction mixture at least one supplementary activating material, such as for example, a relatively small amount of at least one material of the polycyclic aromatic compound type, inclusive of condensed ring hydrocarbons such as naphthalene and phenanthrene, as well as the uncondensed polycyclic compounds such as diphenyl, the terphenyls, dinaphthyl, tetraphenylethylene, and the like. The polyphenyl compounds such as diphenyl and the terphenyls and their mixtures have been found to be particularly useful. The amount of the hydrocarbon to be used will vary over a range which, in every case, will be relatively small in comparison with the amount of diolefin undergoing reaction. Concentrations in the range of 1 to 10 weight percent based on the amount of diolefin compound are ordinarily quite sufficient.

Additionally, it is desirable, in carrying out the reaction between the alkali metal and the material to be dimerized, to utilize a solid friable attrition agent as use thereof generally results in improved utilization of the alkali metal. That is, the use of appropriate sized attrition agents and, preferably, one which is capable of undergoing pulverization under the conditions of the reaction, generally effects a substantial rise in yield of dimerization products based on the alkali metal utilized and at the same time maintains the same high selectivity of dimerization and high yields based on the diolefin.

Amounts of the attrition agents in the range of 2.5 to 8 parts to one part of solid alkali metal have been found to be generally satisfactory, although smaller and larger amounts are effective but to smaller degrees, in the first place because of the limited attrition action, and in the

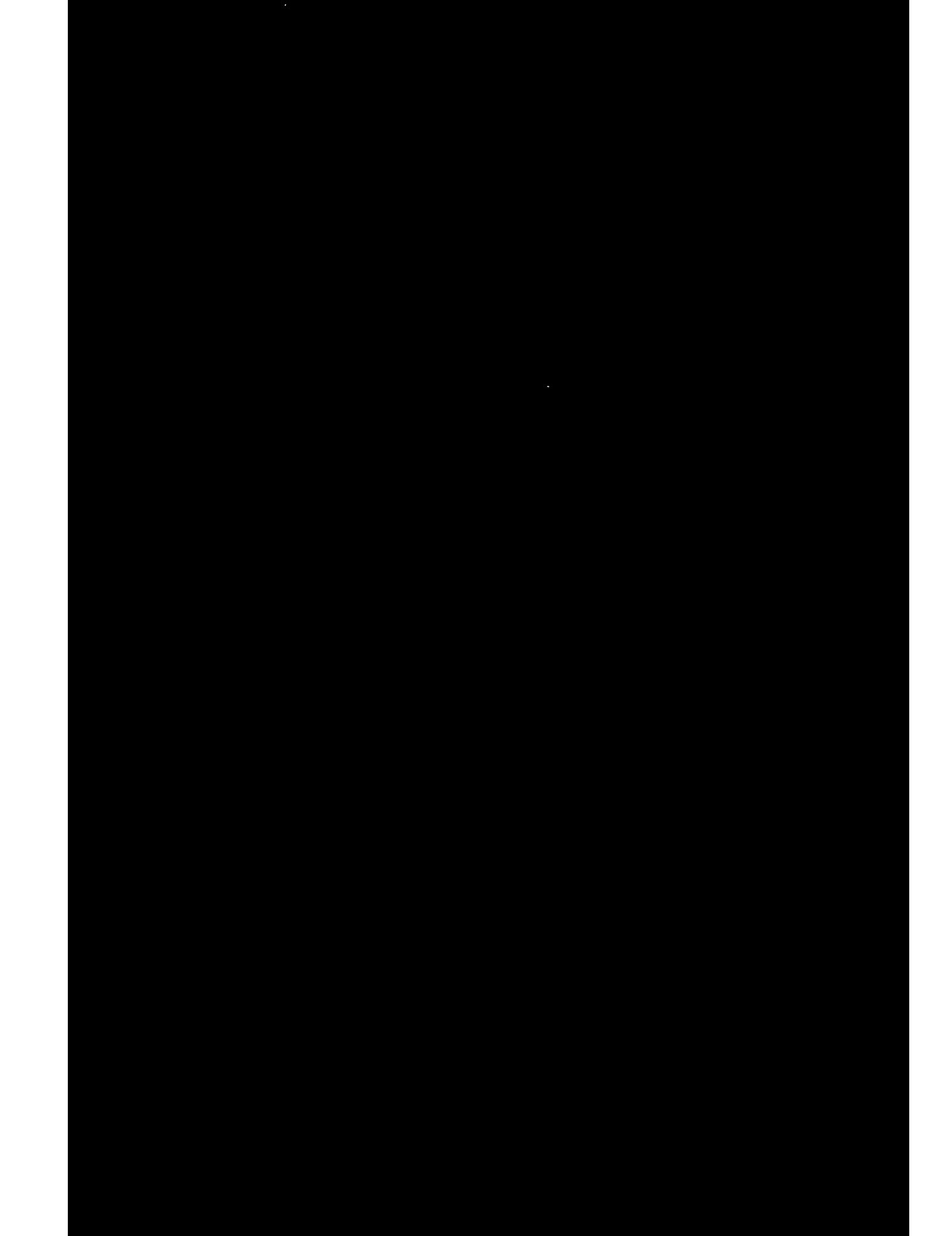

tion of the ether is carried out, as precipitation of rubbery products on the desired solid components of the mixture and formation of colored by-products occurs along with a tendency for certain desired components to undergo isomerization. The aforesaid formation of emulsions is undesirable as the nature thereof is such that they are difficult to break whereby desired products that are in the emulsion phase are not recoverable in the absence of extensive and expensive emulsion-breaking operations. Similarly, the precipitation of rubbery products on the solid, desired water soluble components is extremely undesirable as they impair the water solubility of such products in aqueous mediums such as are used for subsequent processing of the carbonated effluent and in which medium it is necessary to dissolve the solid constituents of the carbonator effluent.

In accordance with this invention, carbonator effluents prepared as aforedescribed and suitable for practice of this invention are subjected to a separation treatment under conditions whereby there is produced a solid phase substantially devoid of materials that cause the aforesaid difficulties when the carbonator effluents are admixed with water and/or are subjected to an elevated temperature. Thus, by subjecting the carbonator effluents to a separation treatment as embodied herein, there is obtained a solid phase mixture of inorganic salts (attrition agent) when used, the desired salts of organic acids, and unreacted sodium and a filtrate containing the emulsion-inducing and rubber-like forming materials that are present in the carbonation effluent. As for the temperature at which the separation treatment may be carried out, it is maintained at least slightly below the boiling point of the solvent phase, preferably below 0° C., and still more preferably below about —15° C. In general, the separation treatment is carried out at the temperature of the carbonator effluent from the carbonation operation. Thus, in accordance with this invention and before the carbonator effluent from a process as aforedescribed is subjected to contact with an aqueous medium and/or an elevated temperature, the effluent is subjected to a separation treatment effective for separation therefrom of the desired solid components of the mixture substantially or completely devoid of liquid constituents in the effluent that induce processing difficulties as aforediscussed.

In practice of this invention, the separation treatment may be effected by use of a pressure filter (e. g., rotary filter, plate and frame filter, etc.), or a liquid cyclone separator, or a multiple stage centrifuge, or other apparatus suitable for separation of solid mediums from liquids in mixtures thereof. Generally, in carrying out the treatment embodied herein, the solid materials are separated from the liquids in the carbonator effluent by directly subjecting the carbonator effluent to the separation treatment. However, in the case of preparation of metalation reaction mixtures as aforedescribed in which additional solvent may be desired or required for maintaining the normally liquid components of the effluent in solution, additional solvent may be added to the effluent prior to subjecting same to the separation treatment. For such a purpose, an ether such as used in the metalation reaction is highly suitable although other materials such as heptane, octane or alkylate may also be employed. As aforesaid, however, the invention is generally suitably carried out by subjecting the carbonator effluent, derived from a metalation reaction mixture prepared as aforedescribed, directly to the separation treatment and at the temperature of the carbonator effluent, e. g., below about 0° C. and preferably below —15° C. In certain instances, and when it is desired to insure substantial or complete removal of the undesirable substances in the carbonator effluent, the solid fraction, comprising the salts of the desired organic acids, from the separation treatment may be subjected to a wash or plurality of washes with a solvent as aforedefined. It has been found that by subjecting the carbonator effluent, derived from a process as aforedescribed, to the separation treatment embodied herein, the solid fraction obtained therefrom is devoid of emulsion-forming constituents and constituents that per se or, upon being subjected to an elevated temperature, coat the desired solid constituents of the carbonator effluent whereby the desired solubility of the solid constituents in water is impaired. Thus, by selective removal from the carbonator effluent of constituents that present processing difficulties upon admixture with water and/or upon being subjected to an elevated temperature, the advantages realized by practice of this invention include improved yields of desired products and facilitation of processing operations to which constituents of the carbonator effluent are subjected, particularly operations utilizing aqueous mediums such as are used to destroy unreacted alkali metal and to solubilize the desired salts of organic acids for treatments to ultimately produce and liberate the corresponding saturated acids.

In order to further describe the invention, but without intent of limitation, the following embodiments are set forth in which the relative amounts of materials described are expressed in parts by weight unless otherwise defined.

A sodium dispersion was prepared by placing in a suitable vessel 562 parts of a $C_{12}$ alkylate (propylene tetramers) and 200 parts of sodium. The mixture was heated until the sodium melted (M. P. 97.5° C.). The resulting mixture was then subjected to vigorous agitation and two parts of a dimer of linoleic acid were added whereby there was produced a dispersion of sodium having a particle size in the range of 5 to 15 microns.

The dispersion was allowed to cool to room temperature and added to 2,000 parts of dimethyl ether which was precooled and maintained at —25° C. A mixture of 600 parts of sodium sulfate was then added to the resulting mixture followed by addition of 473 parts of butadiene and 1 part of terphenyl.

Under the aforesaid conditions, reaction occurred rapidly whereby there was produced a slurry comprising selectively formed disodio derivatives of octadienes. The slurry was then subjected to carbonation at —20° C. by contacting the slurry with gaseous carbon dioxide in an amount substantially in excess of that theoretically required to carbonate the sodio derivatives in the metalation reaction mixture.

A portion of the effluent from the carbonation operation was subjected to a temperature of 347° F. whereby substantially complete removal of the dimethyl ether from the carbonator effluent was effected. The resulting mixture, from which the ether was substantially removed, was then admixed with an excess of hot water to destroy unreacted sodium present in the mixture and to dissolve the desired carboxylated products present in the carbonator effluent. Upon such admixture with water, substantial emulsification occurred and, in addition, a substantial amount of normally water soluble material did not dissolve due to having been coated with a rubbery-like substance that impaired its water solubility. Moreover, and in subsequent operations utilizing the resulting aqueous phase for hydrogenation of the salts of the unsaturated organic acids and neutralization ($H_2SO_4$) of hydrogenated products in the aqueous medium, severe emulsification also occurred thereby resulting in product losses which were not recoverable therefrom in absence of extensive and uneconomic emulsion-breaking operations.

In accordance with this invention, another portion of the same carbonator effluent was filtered in a pressure filter at about —30° C. whereby there was obtained a filter cake comprised substantially of inorganic salts (attrition agent), salts of the desired $C_{10}$ dicarboxylic acids and a small amount of the salts of desired monobasic acids, and unreacted sodium. The filter cake was then admixed with an excess of hot water, and subjected to hydrogenation and neutralization operations under conditions as used for the aforedescribed treatment of the portion of the carbonator effluent that was not subjected to the separation operation as embodied herein, but which prior to admixture with water, was subjected to an elevated temperature for evaporation of the ether. By the aforesaid treatment in accordance with this invention, wherein the carbonator effluent was filtered at the relatively low temperature in presence of the relatively large amount of dimethylether, admixture of the filter cake with hot water and use of the resulting aqueous solution in the aforedescribed processing operations for hydrogenation and neutralization did not result in emulsification or insolubility of normally water soluble components whereby processing difficulties due to emulsification and losses of normally water soluble products were not encountered.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process wherein an olefin is reacted with a finely divided alkali metal in the presence of a liquid reaction medium and a polycyclic aromatic hydrocarbon to produce a metalation reaction mixture comprising alkali metal derivatives of said olefin including dialkali metal derivatives of dimers of said olefin, the metalation reaction mixture is subjected to carbonation to convert said alkali metal derivatives to alkali metal salts of carboxylic acids including the conversion of said dialkali metal derivatives to dialkali metal salts of dicarboxylic acids having two more carbon atoms per molecule than the dimers of said olefin to produce a carbonated mixture comprising solid components including said salts and a liquid phase including said liquid reaction medium, and the alkali metal salt components of said carbonation reaction mixture are subjected to at least one of the conditions consisting of an elevated temperature and contact with an aqueous medium, the improvement which comprises separating the solid components from the liquid phase of the carbonation reaction mixture at a temperature of below about 0° C. prior to subjecting said solid components to either of said conditions.

2. A process, as defined in claim 1, wherein the separation of the solid components from the liquid components of the carbonation reaction mixture is carried out at a temperature below the boiling point of the liquid phase of the carbonation mixture.

3. A process, as defined in claim 1, wherein the olefin is an aliphatic conjugated diolefin containing from 4 to 8 carbon atoms, the liquid reaction medium is an ether from the group consisting of aliphatic monoethers having a methoxy group and an oxygen to carbon ratio of not less than 1:4 and polyethers derived from an aliphatic polyhydric alcohol having all of the hydroxyl hydrogen atoms replaced by alkyl groups and mixtures thereof, and the reaction between the olefin and the alkali metal is carried out at a temperature below about 0° C.

4. A process, as defined in claim 1, wherein the separation of the solid components from the carbonation mixture is carried out by filtration of said mixture.

5. A process, as defined in claim 1, wherein the reaction between the olefin and alkali metal is carried out in the presence of a solid friable attrition agent.

6. A process, as defined in claim 1, wherein the olefin is butadiene.

7. In a process wherein butadiene is reacted with a finely divided alkali metal in the presence of a polycyclic aromatic hydrocarbon and an ether from the group consisting of aliphatic monoethers having a methoxy group and an oxygen to carbon ratio of not less than 1:4 and polyethers derived from an aliphatic polyhydric alcohol having all of the hydroxyl hydrogen atoms replaced by alkyl groups and mixtures thereof, at a temperature below about 0° C. to produce a metalation reaction mixture comprising alkali metal derivatives of butadiene including dialkali metal derivatives of octadienes, the metalation reaction mixture is carbonated at below about 0° C. to convert said alkali metal derivatives to alkali metal salts including the conversion of said dialkali octadienes to dialkali metal salts of $C_{10}$ unsaturated aliphatic dicarboxylic acids to produce a carbonated mixture comprising a solid phase including said salts of $C_{10}$ unsaturated acids and a liquid phase comprising said ether, and the alkali metal components of said carbonation reaction mixture are subjected to at least one of the conditions consisting of an elevated temperature and contact with an aqueous medium, the improvement which comprises separating the solid components from the liquid components of said carbonation reaction mixture at a temperature of below about 0° C. prior to subjecting said solid components to either of said conditions.

8. A process, as defined in claim 7, wherein the ether is dimethyl ether and the alkali metal is sodium.

9. A process, as defined in claim 8, wherein the reaction between butadiene and alkali metal is carried out in presence of a solid, friable attrition agent.

10. A process, as defined in claim 7, wherein the ether is dimethyl ether, the alkali metal is finely divided sodium dispersed in a saturated hydrocarbon, and the reaction between butadiene and alkali metal is carried out in presence of a water-soluble salt of sodium as a solid friable attrition agent, and a dispersing agent.

References Cited in the file of this patent

UNITED STATES PATENTS

| | | |
|---|---|---|
| 2,352,461 | Walker | June 27, 1944 |
| 2,716,662 | Cohen et al. | Aug. 30, 1955 |
| 2,749,364 | Greenberg | June 5, 1956 |

FOREIGN PATENTS

| | | |
|---|---|---|
| 1,093,096 | France | Nov. 17, 1954 |